United States Patent
Liu et al.

(10) Patent No.: US 10,129,471 B2
(45) Date of Patent: Nov. 13, 2018

(54) METHOD, APPARATUS AND SYSTEM FOR DETECTING LOCATION OF LASER POINT ON SCREEN

(71) Applicant: Huawei Technologies Co., Ltd., Shenzhen (CN)

(72) Inventors: Zhaoxiang Liu, Shenzhen (CN); Shiguo Lian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 15/207,101

(22) Filed: Jul. 11, 2016

(65) Prior Publication Data

US 2017/0046843 A1  Feb. 16, 2017

(30) Foreign Application Priority Data

Aug. 11, 2015  (CN) .......................... 2015 1 0490798

(51) Int. Cl.
*G06K 9/00* (2006.01)
*H04N 5/232* (2006.01)
(Continued)

(52) U.S. Cl.
CPC ......... *H04N 5/23238* (2013.01); *G02B 27/20* (2013.01); *G06F 3/03* (2013.01);
(Continued)

(58) Field of Classification Search
None
See application file for complete search history.

(56) References Cited

U.S. PATENT DOCUMENTS

| 7,180,510 B2 | 2/2007 | Inoue et al. |
| 7,193,608 B2 | 3/2007 | Stuerzlinger |

(Continued)

FOREIGN PATENT DOCUMENTS

| CN | 1534544 A | 10/2004 |
| CN | 102262733 A | 11/2011 |

(Continued)

OTHER PUBLICATIONS

Partial English Translation and Abstract of Chinese Patent Application No. CN1534544, Oct. 6, 2004, 10 pages.

(Continued)

*Primary Examiner* — Delomia L Gilliard
(74) *Attorney, Agent, or Firm* — Conley Rose, P.C.

(57) ABSTRACT

A method for detecting a location of a laser point on a screen includes acquiring a first image frame captured by a first camera among N cameras; detecting whether a first laser point exists in the first image frame; and when the first laser point exists in the first image frame, and no laser point exists in an image frame captured by another camera except the first camera among the N cameras, using the first laser point as the laser point on the screen, and acquiring information about a location of the first laser point on the screen. In the present application, images captured by all cameras do not need to be fused first; instead, laser point detection is performed directly on a captured image frame. This greatly improves efficiency of the laser point detection and improves detection accuracy.

20 Claims, 5 Drawing Sheets

(51) Int. Cl.
*G02B 27/20* (2006.01)
*H04N 5/247* (2006.01)
*H04N 9/31* (2006.01)
*G06F 3/03* (2006.01)

(52) U.S. Cl.
CPC .............. *H04N 5/232* (2013.01); *H04N 5/247* (2013.01); *H04N 9/3161* (2013.01); *H04N 9/3194* (2013.01)

(56) References Cited

U.S. PATENT DOCUMENTS

| | | |
|---|---|---|
| 8,508,472 B1 | 8/2013 | Wieder |
| 2003/0067441 A1 | 4/2003 | Hamana et al. |
| 2006/0284832 A1 | 12/2006 | Kuo |
| 2006/0290684 A1 | 12/2006 | Giraldo et al. |
| 2009/0046061 A1* | 2/2009 | Denoue .............. G06F 3/0304 345/158 |
| 2009/0309834 A1* | 12/2009 | Adams ................ G06F 3/03542 345/166 |
| 2011/0316771 A1 | 12/2011 | Kume |
| 2012/0229384 A1 | 9/2012 | Nakane et al. |

FOREIGN PATENT DOCUMENTS

| | | | |
|---|---|---|---|
| CN | 102270298 A | | 12/2011 |
| CN | 102778980 A | | 11/2012 |
| CN | 102262733 B | * | 3/2014 |
| EP | 0718748 A2 | | 6/1996 |
| WO | 2008014819 A1 | | 2/2008 |

OTHER PUBLICATIONS

Partial English Translation and Abstract of Chinese Patent Application No. CN102262733, Nov. 30, 2011, 9 pages.
Partial English Translation and Abstract of Chinese Patent Application No. CN102270298, Dec. 7, 2011, 13 pages.
Partial English Translation and Abstract of Chinese Patent Application No. CN102778980, Nov. 14, 2012, 13 pages.

* cited by examiner

METHOD, APPARATUS AND SYSTEM FOR DETECTING LOCATION OF LASER POINT ON SCREEN

CROSS-REFERENCE TO RELATED APPLICATION

This application claims priority to Chinese Patent Application No. 201510490798.7, filed on Aug. 11, 2015, which is hereby incorporated by reference in its entirety.

TECHNICAL FIELD

Embodiments of the present application relate to the communications technologies, and in particular, to a method, an apparatus and a system for detecting a location of a laser point on a screen.

BACKGROUND

At present, a laser pointer is an interactive device commonly used in a projection screen display system. A laser emitted by the laser pointer projects a laser point onto the screen, and control over a projection device can be effectively implemented by detecting, using a camera, a movement of the laser point on the screen.

As a projected area increases, it is difficult for a single camera to cover an entire screen. Multiple cameras are used to capture an image on the screen, and each of the cameras is responsible for capturing an image in one area on the screen. First, image fusion is performed on an overlapping area captured by different cameras; then laser point detection is performed on an entire frame to determine a location of a laser point; finally, information about the location of the laser point is output by means of coordinate transformation.

However, each time an image is captured, image fusion needs to be performed first, and then laser point detection is performed on an entire frame. This results in extremely poor real-time performance in an entire process of acquiring a location of a laser point.

SUMMARY

The present application provides a method, an apparatus and a system for detecting a location of a laser point on a screen, so as to solve a problem of poor real-time performance of location acquiring during laser point detection on a projection screen.

A first aspect of embodiments of the present application provides a method for detecting a location of a laser point on a screen, where the method is applied to a screen projection system, the system includes a screen and N cameras, the screen includes N screen areas, the N cameras are used to capture images in the N screen areas, the screen areas correspond to the cameras in a one-to-one manner, N is a positive integer greater than 1, and the method includes acquiring a first image frame captured by a first camera among the N cameras; detecting whether a first laser point exists in the first image frame; and when the first laser point exists in the first image frame, and no laser point exists in an image frame captured by another camera except the first camera among the N cameras, using the first laser point as a laser point on the screen, and acquiring information about a location of the first laser point on the screen.

With reference to the first aspect, in a first possible implementation manner of the first aspect, when laser points exist in at least two previous image frames of the first image frame, the detecting whether a first laser point exists in the first image frame includes determining a motion tendency of a laser point in a first screen area among the N screen areas according to information about locations of the laser points in the at least two previous image frames, where the first image frame includes an image in the first screen area; determining a first detection area in the first image frame according to the motion tendency; and detecting whether the first laser point exists in the first detection area.

With reference to the first possible implementation manner of the first aspect, in a second possible implementation manner of the first aspect, the detecting whether the first laser point exists in the first detection area includes detecting whether a first pixel exists in the first detection area, where pixels constituting the first laser point include the first pixel; and correspondingly, the acquiring information about a location of the first laser point on the screen includes determining a second detection area in the first image frame according to information about a location of the first pixel in the first image frame; detecting a second pixel in the second detection area, where the pixels constituting the first laser point include the second pixel, and acquiring information about a location of the second pixel in the first image frame; and acquiring the information about the location of the first laser point on the screen according to the information about the location of the second pixel in the first image frame.

With reference to the first aspect, in a third possible implementation manner of the first aspect, the detecting whether a first laser point exists in the first image frame includes determining a scanning area in the first image frame; performing downsampling on the scanning area by using m rows as a vertical sampling interval and n columns as a horizontal sampling interval to obtain a downsampling result, where m is a positive integer, and n is a positive integer; and detecting whether the first laser point exists in the downsampling result.

With reference to the third possible implementation manner of the first aspect, in a fourth possible implementation manner of the first aspect, the downsampling result includes a low-resolution image frame obtained after the downsampling is performed on the scanning area; and the acquiring information about a location of the first laser point on the screen includes acquiring information about a low-resolution location of the first laser point in the low-resolution image frame; determining a potential area in the first image frame, where the potential area corresponds to the information about the low-resolution location; detecting the first laser point in the potential area, and acquiring information about a location of the first laser point in the first image frame; and acquiring the information about the location of the first laser point on the screen according to the information about the location of the first laser point in the first image frame.

With reference to any one of the first aspect to the fourth possible implementation manner of the first aspect, in a fifth possible implementation manner of the first aspect, the method further includes, when a second laser point exists in a second image frame captured by a second camera among the N cameras, acquiring information about a location, on the screen, of the laser point on the screen according to the first laser point and the second laser point.

With reference to the fifth possible implementation manner of the first aspect, in a sixth possible implementation manner of the first aspect, the acquiring information about a location, on the screen, of the laser point on the screen according to the first laser point and the second laser point includes determining the laser point on the screen from the first laser point and the second laser point; and acquiring the information about the location, on the screen, of the laser point on the screen.

With reference to the sixth possible implementation manner of the first aspect, in a seventh implementation manner of the first aspect, when the laser points exist in the at least two previous image frames of the first image frame that is captured by the first camera, the determining the laser point on the screen from the first laser point and the second laser point includes using the first laser point as the laser point on the screen when the motion tendency of the laser point in the first screen area among the N screen areas is from the first screen area to a second screen area among the N screen areas, where the motion tendency is obtained according to the information about the locations of the laser points in the at least two previous image frames, the first image frame includes the image in the first screen area, and the second image frame includes an image in the second screen area; or using the second laser point as the laser point on the screen when the motion tendency is from a second screen area to the first screen area.

With reference to the fifth possible implementation manner of the first aspect, in an eighth possible implementation manner of the first aspect, the acquiring information about a location, on the screen, of the laser point on the screen according to the first laser point and the second laser point includes determining whether the first laser point and the second laser point are a same laser point according to first location information of the first laser point and second location information of the second laser point, where the first location information is the information about the location of the first laser point in the first image frame, the second location information is information about a location of the second laser point in the second image frame, the second image frame includes an image in a second screen area among the N screen areas, the first image frame includes the image in the first screen area among the N screen areas, and the second screen area is adjacent to the first screen area; and when the first laser point and the second laser point are the same laser point, acquiring the information about the location, on the screen, of the laser point on the screen according to the first location information and the second location information.

With reference to any one of the first aspect to the eighth possible implementation manner of the first aspect, in a ninth possible implementation manner of the first aspect, the first camera is a wide-angle camera; and before the acquiring information about a location of the first laser point on the screen, the method further includes calibrating the first location information to calibrate a distortion resulting from the wide-angle camera, so that the information about the location, on the screen, of the laser point on the screen is acquired according to the calibrated location information, where the first location information is the information about the location of the first laser point in the first image frame.

A second aspect of the embodiments of the present application provides an apparatus for detecting a location of a laser point on a screen, where the apparatus is applied to a screen projection system, the system includes a screen and N cameras, the screen includes N screen areas, the N cameras are used to capture images in the N screen areas, the screen areas correspond to the cameras in a one-to-one manner, N is a positive integer greater than 1, and the apparatus includes a first acquiring module configured to acquire a first image frame captured by a first camera among the N cameras; a detection module configured to detect whether a first laser point exists in the first image frame acquired by the first acquiring module; and a second acquiring module configured to, when the detection module determines that the first laser point exists in the first image frame, and no laser point exists in an image frame captured by another camera except the first camera among the N cameras, use the first laser point as a laser point on the screen, and acquire information about a location of the first laser point on the screen.

With reference to the second aspect, in a first possible implementation manner of the second aspect, the detection module is configured to, when laser points exist in at least two previous image frames of the first image frame, determine a motion tendency of a laser point in a first screen area among the N screen areas according to information about locations of the laser points in the at least two previous image frames, where the first image frame includes an image in the first screen area; determine a first detection area in the first image frame according to the motion tendency; and detect whether the first laser point exists in the first detection area.

With reference to the first possible implementation manner of the second aspect, in a second possible implementation manner of the second aspect, the detection module is configured to detect whether a first pixel exists in the first detection area, where pixels constituting the first laser point include the first pixel; and correspondingly, the second acquiring module is configured to determine a second detection area in the first image frame according to information about a location of the first pixel in the first image frame; detect a second pixel in the second detection area, where the pixels constituting the first laser point include the second pixel, and acquire information about a location of the second pixel in the first image frame; and acquire the information about the location of the first laser point on the screen according to the information about the location of the second pixel in the first image frame.

With reference to the second aspect, in a third possible implementation manner of the second aspect, the detection module is configured to determine a scanning area in the first image frame; perform downsampling on the scanning area by using m rows as a vertical sampling interval and n columns as a horizontal sampling interval to obtain a downsampling result, where m is a positive integer, and n is a positive integer; and detect whether the first laser point exists in the downsampling result.

With reference to the third possible implementation manner of the second aspect, in a fourth possible implementation manner of the second aspect, the downsampling result includes a low-resolution image frame acquired after the downsampling is performed on the scanning area; and the second acquiring module is configured to acquire information about a low-resolution location of the first laser point in the low-resolution image frame; determine a potential area in the first image frame, where the potential area corresponds to the information about the low-resolution location; detect the first laser point in the potential area, and acquire information about a location of the first laser point in the first image frame; and acquire the information about the location of the first laser point on the screen according to the information about the location of the first laser point in the first image frame.

With reference to any one of the second aspect to the fourth possible implementation manner of the second aspect, in a fifth possible implementation manner of the second aspect, the second acquiring module is further configured to, when a second laser point exists in a second image frame captured by a second camera among the N cameras, acquire information about a location, on the screen, of the laser point on the screen according to the first laser point and the second laser point.

With reference to the fifth possible implementation manner of the second aspect, in a sixth possible implementation manner of the second aspect, the second acquiring module is configured to determine the laser point on the screen from the first laser point detected by the detection module and the second laser point; and acquire the information about the location, on the screen, of the laser point on the screen.

With reference to the sixth possible implementation manner of the second aspect, in a seventh possible implementation manner of the second aspect, the second acquiring module is configured to, when the laser points exist in the at least two previous image frames of the first image frame that is captured by the first camera, use the first laser point as the laser point on the screen when the motion tendency of the laser point in the first screen area among the N screen areas is from the first screen area to a second screen area among the N screen areas, where the motion tendency is obtained according to the information about the locations of the laser points in the at least two previous image frames, the first image frame includes the image in the first screen area, and the second image frame includes an image in the second screen area; or use the second laser point as the laser point on the screen when the motion tendency is from a second screen area to the first screen area.

With reference to any one of the second aspect to the fifth possible implementation manner of the second aspect, in an eighth possible implementation manner of the second aspect, the second acquiring module is configured to determine whether the first laser point and the second laser point are a same laser point according to first location information of the first laser point detected by the detection module and second location information of the second laser point, where the first location information is the information about the location of the first laser point in the first image frame, the second location information is information about a location of the second laser point in the second image frame, the second image frame includes an image in a second screen area among the N screen areas, the first image frame includes the image in the first screen area among the N screen areas, and the second screen area is adjacent to the first screen area; and when the first laser point and the second laser point are the same laser point, acquire the information about the location, on the screen, of the laser point on the screen according to the first location information and the second location information.

With reference to any one of the second aspect to the eighth possible implementation manner of the second aspect, in a ninth possible implementation manner of the second aspect, the first camera is a wide-angle camera; and the apparatus further includes a calibration module configured to calibrate the first location information to calibrate a distortion resulting from the wide-angle camera, so that the second acquiring module acquires the information about the location, on the screen, of the laser point on the screen according to the calibrated location information, where the first location information is the information about the location of the first laser point in the first image frame.

A third aspect of the present application provides a screen projection system, including a screen, the apparatus for detecting a location of a laser point on a screen according to any one of the second aspect to the eighth possible implementation manner of the second aspect, and N cameras, where N is a positive integer greater than 1; and the screen includes N screen areas, the N cameras capture images in the N screen areas, and the screen areas correspond to the cameras in a one-to-one manner.

With reference to the third aspect, in a first possible implementation manner of the third aspect, the system includes N projection devices, the N screen areas are N subscreens, the screen is a spliced projection screen including the N subscreens, the subscreens correspond to the projection devices in a one-to-one manner, and no overlapping area exists between respective projection areas of the N projection devices.

With reference to the third aspect or the first possible implementation manner of the third aspect, in a second possible implementation manner of the third aspect, the system further includes a synchronization apparatus, where the synchronization apparatus connects to the N cameras, and the synchronization apparatus is configured to control the N cameras to capture the images in the N screen areas at the same time.

With reference to any one of the third aspect to the second possible implementation manner of the third aspect, in a third possible implementation manner of the third aspect, no overlapping area exists between the respective images captured by the N cameras.

According to the method, the apparatus and the system for detecting a location of a laser point on a screen provided in the embodiments of the present application, images captured by all cameras do not need to be fused first; instead, laser point detection is performed directly on a captured image frame. This greatly improves real-time performance of location acquiring during the laser point detection.

BRIEF DESCRIPTION OF THE DRAWINGS

To describe the technical solutions in the embodiments of the present application more clearly, the following briefly introduces the accompanying drawings required for describing the embodiments. The accompanying drawings in the following description show some embodiments of the present application, and persons of ordinary skill in the art may still derive other drawings from these accompanying drawings without creative efforts.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. The described embodiments are some but not all of the embodiments of the present application. All other embodiments obtained by persons of ordinary skill in the art based on the embodiments of the present application without creative efforts shall fall within the protection scope of the present application.

A screen projection system in an embodiment of the present application may include a screen, a laser pointer, N cameras, a projection device, and an apparatus for detecting a location of a laser point on a screen, where the screen receives an image projected by the projection device, the laser pointer projects a laser point onto the screen, the cameras capture the image on the screen and output the image to the apparatus for detecting a location of a laser point on a screen, and the apparatus for detecting a location of a laser point on a screen acquires coordinates of the laser point on the image by means of processing. The screen may include N screen areas. The screen may be an entire screen or may be a spliced projection screen obtained by splicing multiple subscreens. A principle of acquiring the coordinates of the laser point on the entire screen is basically the same as a principle of acquiring the coordinates of the laser point on the spliced projection screen. Light filters may be disposed on the cameras to obtain an image with a high signal-to-noise ratio.

Figure 1:
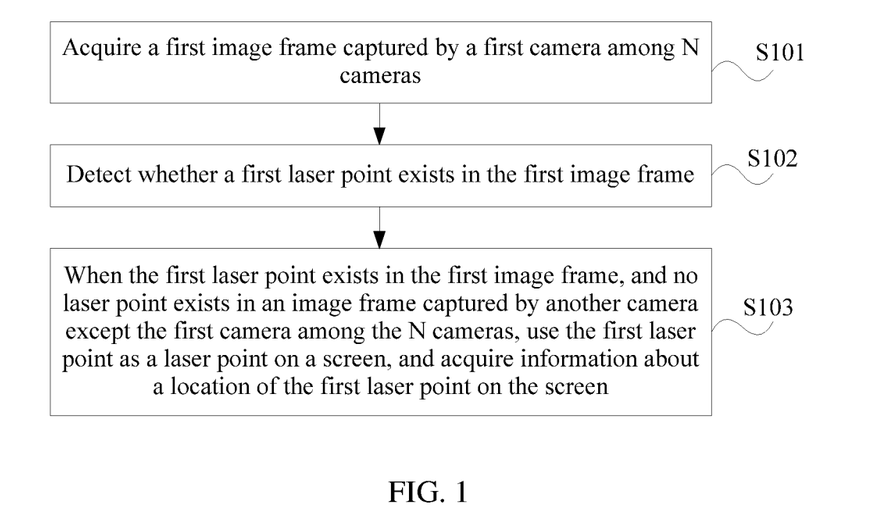
FIG. 1 is a schematic flowchart of Embodiment 1 of a method for detecting a location of a laser point on a screen according to the present application.

FIG. 1 is a schematic flowchart of Embodiment 1 of a method for detecting a location of a laser point on a screen according to the present application. In this embodiment, the screen includes N screen areas, N cameras are used to capture images in the N screen areas, the screen areas correspond to the cameras in a one-to-one manner, and N is a positive integer greater than 1.

Each of the cameras transmits a captured image to an apparatus for detecting a location of a laser point on a screen, where the apparatus sits in the background. The apparatus for detecting a location of a laser point on a screen separately processes the image transmitted by each of the cameras, so as to detect a laser point. An image captured by another camera is not considered in a process of detecting the laser point.

In this embodiment, one or more projection devices may be available. If multiple projection devices are available, each of the projection devices may correspond to one or more screen areas and project an image in a corresponding screen area.

The method may be performed by the apparatus for detecting a location of a laser point on a screen, and the apparatus for detecting a location of a laser point on a screen may be a processing device such as a computer or a notebook computer. As shown in FIG. 1, the method includes the following steps.

S101. Acquire a first image frame captured by a first camera among the N cameras. The first camera corresponds to a first screen area, the first image frame includes an image in the first screen area, and the first camera is one of the N cameras.

The first camera may be any one of the N cameras.

S102. Detect whether a first laser point exists in the first image frame.

S103. When the first laser point exists in the first image frame, and no laser point exists in an image frame captured by another camera except the first camera among the N cameras, use the first laser point as the laser point on the screen, and acquire information about a location of the first laser point on the screen. That is, use the first laser point as a laser point actually projected by a laser pointer onto the screen, where the information about the location may be a coordinate value.

An image captured by the another camera includes an image in another screen area except the first screen area among the N screen areas.

During acquiring the information about the location of the first laser point on the screen, information about a location of the first laser point in the first image frame is acquired first, that is, information about coordinates of the first laser point in a camera coordinate system is acquired, and then the information about the coordinates of the first laser point in the camera coordinate system is converted into information about coordinates in a screen display coordinate system according to a mapping relationship between the camera coordinate system and the screen display coordinate system, where the information about the coordinates of the first laser point in the screen display coordinate system is the information about the location of the first laser point on the screen.

It should be noted that the apparatus for detecting a location of a laser point on a screen may simultaneously process images captured by the N cameras, that is, perform laser point detection separately in image frames captured by the N cameras; determine, after detecting the first laser point, whether a laser point is detected in the image frame captured by the another camera among the N cameras; and if no laser point is detected in the image frame captured by the another camera among the N cameras, directly determine that the first laser point is the laser point on the screen, and acquire the information about the location of the first laser point on the screen.

When multiple cameras capture images, it is impossible to have a completely clear boundary, and therefore an overlapping area may exist when images in adjacent areas are captured. That is, when capturing an image in an adjacent second screen area, a second camera may also capture a part of the image in the first screen area, where the image in the first screen area is captured by the first camera second screen area. Therefore, after a laser point is detected, information about an actual location of the laser point can be determined in a more accurate manner by considering whether a laser point exists in the image captured by the another camera.

In this embodiment, a first image frame captured by a first camera is acquired; whether a first laser point exists in the first image frame is detected; and when the first laser point exists in the first image frame, and no laser point exists in an image captured by another camera except the first camera among N cameras, it is determined that the first laser point is a laser point on a screen, and information about a location of the first laser point on the screen is acquired. That is, images captured by all cameras do not need to be fused first; instead, laser point detection is directly performed on a captured image frame. This greatly improves efficiency of the laser point detection and improves detection accuracy.

Figure 2:
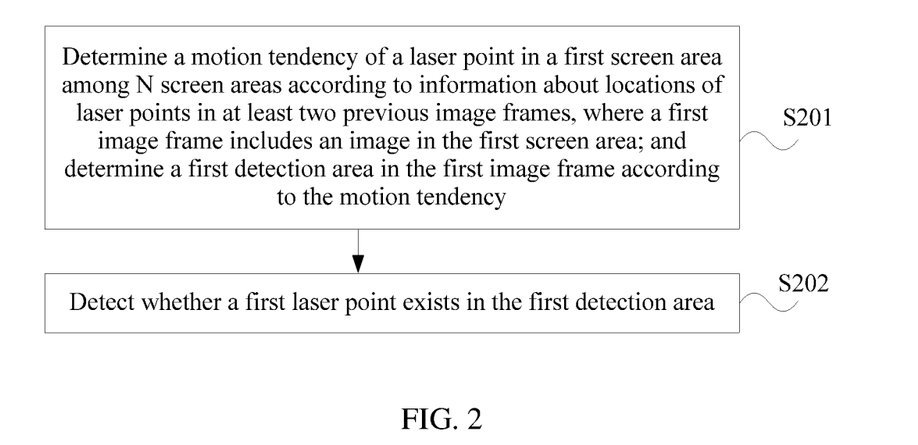
FIG. 2 is a schematic flowchart of Embodiment 2 of a method for detecting a location of a laser point on a screen according to the present application.

FIG. 2 is a schematic flowchart of Embodiment 2 of a method for detecting a location of a laser point on a screen according to the present application. As shown in FIG. 2, if laser points exist in at least two previous image frames of the first image frame, the detecting whether a first laser point exists in the first image frame includes the following steps.

S201. Determine a motion tendency of a laser point in a first screen area among the N screen areas according to information about locations of the laser points in the at least two previous image frames, where the first image frame includes an image in the first screen area; and determine a first detection area in the first image frame according to the motion tendency.

When capturing an image, a camera may continuously capture multiple frames of images. The previous image frames refer to image frames captured by the first camera before the first image frame is captured. The motion tendency of the laser point may be determined according to the laser points detected in the previous image frames; a possible location of the laser point is further acquired as a predicted location; and a particular range is extended using the predicted location as a center, and an area in the range is used as the first detection area.

A previous image frame may be only an image of one frame prior to the first image frame, that is, the first detection area may be alternatively determined based on an image of one previous frame.

S202. Detect whether the first laser point exists in the first detection area. If no laser point exists, a detection method shown in FIG. 3 may be further performed.

It should be noted that the detecting whether the first laser point exists in the first detection area may be scanning a pixel point in the first detection area, and acquiring a grayscale value of the scanned pixel point, where if the grayscale value is greater than or equal to a preset threshold, it is determined that the pixel point belongs to the laser point, and if the grayscale value is less than the preset threshold, it indicates that no laser point exists on the pixel point, which, however, is not limited herein. When the first laser point exists in the first detection area, the first laser point exists in the first image frame.

Further, the determining the information about the location of the first laser point in the first image frame may be narrowing down the first detection area, and detecting information about a location of the first laser point in a narrowed-down first detection area.

The detecting whether the first laser point exists in the first detection area includes detecting whether a first pixel exists in the first detection area, where pixels constituting the first laser point include the first pixel; stopping the detection after the first pixel is detected, and determining a second detection area in the first image frame according to information about a location of the first pixel in the first image frame; detecting a second pixel in the second detection area, where the pixels constituting the first laser point include the second pixel, and acquiring information about a location of the second pixel in the first image frame; and acquiring the information about the location of the first laser point on the screen according to the information about the location of the second pixel in the first image frame.

The second detection area may be smaller than the first detection area, and a location of the second detection area may also be different from that of the first detection area. A method for acquiring the information about the location of the first laser point on the screen may be averaging information about locations of second pixels as the information about the location of the first laser point in the first image frame, and acquiring the information about the location of the first laser point on the screen according to the mapping relationship between the camera coordinate system and the screen display coordinate system. The second pixels may include the first pixel or may have or not have an intersection set with the first pixel. A quantity of first pixels may be 1 or 2. A quantity of second pixels may be greater than that of first pixels.

Figure 3:
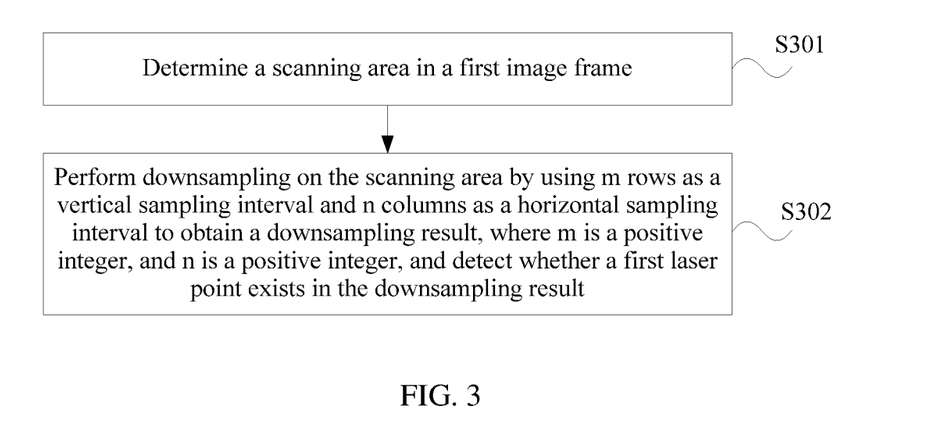
FIG. 3 is a schematic flowchart of Embodiment 3 of a method for detecting a location of a laser point on a screen according to the present application.

FIG. 3 is a schematic flowchart of Embodiment 3 of a method for detecting a location of a laser point on a screen according to the present application. In an initial state, if no laser point is detected in a previous image frame of the first image frame, a laser point may be detected by using the method in FIG. 3. In addition, the method shown in FIG. 3 may be further used to detect a laser point if no laser point is detected in the first image frame by using the method shown in FIG. 2.

As shown in FIG. 3, the detecting whether a laser point exists in the first image frame may be the following.

S301. Determine a scanning area in the first image frame.

In the initial state, no previous image frame is captured, and no other reference is available. Therefore, in this case, a relatively large scanning area may be determined, for example, the entire first image frame may be used as the scanning area.

If no laser point is detected in the first image frame by using the method shown in FIG. 2, a range of the foregoing first detection area may be extended, and a remaining area after the original first detection area is excluded from the extended range is used as the scanning area.

S302. Perform downsampling on the scanning area by using m rows as a vertical sampling interval and n columns as a horizontal sampling interval to obtain a downsampling result, where m is a positive integer, and n is a positive integer; and detect whether the first laser point exists in the downsampling result.

Figure 4:
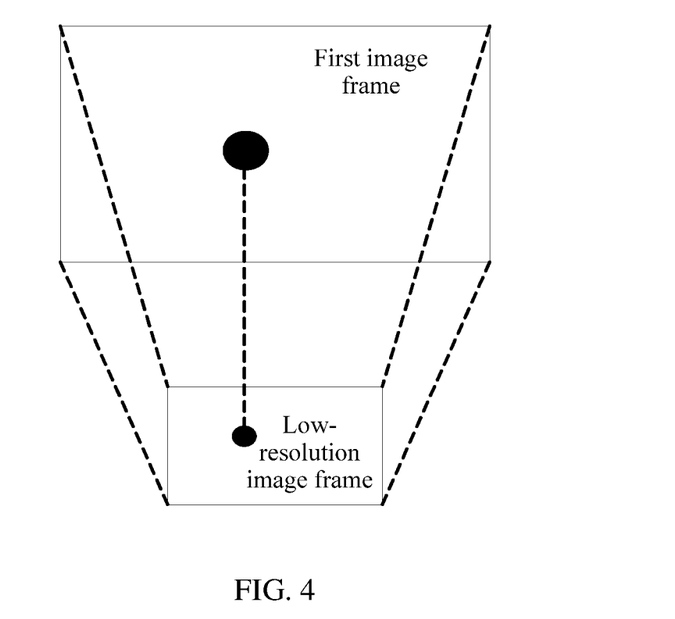
FIG. 4 is a schematic diagram of an image resolution change in a method for detecting a location of a laser point on a screen according to the present application.
Figure 5:
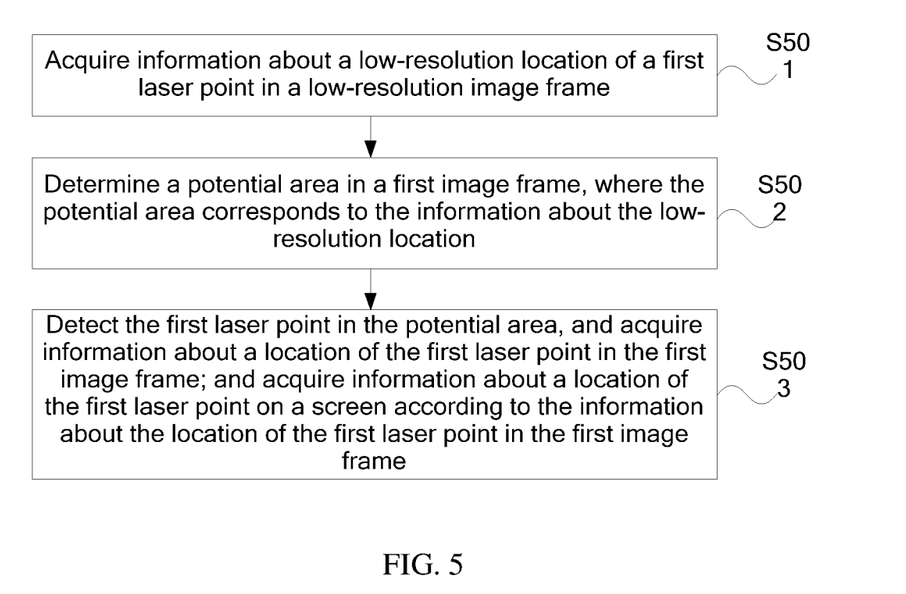
FIG. 5 is a schematic flowchart of Embodiment 4 of a method for detecting a location of a laser point on a screen according to the present application.

When the first laser point exists in the downsampling result, the first laser point exists in the first image frame. FIG. 4 is a schematic diagram of an image resolution change in a method for detecting a location of a laser point on a screen according to the present application. FIG. 5 is a schematic flowchart of Embodiment 4 of a method for detecting a location of a laser point on a screen according to the present application.

The downsampling result includes a low-resolution image frame obtained after downsampling is performed on the first image frame. For example, an image frame whose resolution is 250*250 is obtained by performing downsampling on the first image frame whose original resolution is 500*500. Correspondingly, the acquiring information about a location of the first laser point on the screen includes the following steps.

S501. Acquire information about a low-resolution location of the first laser point in the low-resolution image frame.

S502. Determine a potential area in the first image frame, where the potential area corresponds to the information about the low-resolution location.

Referring to FIG. 4, scanning is performed after the low-resolution image frame is acquired, to detect a laser point. It may be alternatively determined according to a grayscale value of a scanned pixel point. If the grayscale value is greater than or equal to a preset threshold, it is determined that the pixel point belongs to the laser point; if the grayscale value is less than the preset threshold, it indicates that no laser point exists on the pixel point, which, however, is not limited herein.

S503. Detect the first laser point in the potential area, and acquire information about a location of the first laser point in the first image frame; and acquire the information about the location of the first laser point on the screen according to the information about the location of the first laser point in the first image frame.

Referring to FIG. 4, coordinates or a size of the first laser point may be determined in the low-resolution image frame first, then the potential area in the first image frame is deduced according to a mapping relationship between the low-resolution image frame and the first image frame or according to a downsampling frequency, and the first laser point is determined in the potential area. The information about the location of the first laser point in the first image frame is acquired first, and then the information about the location of the first laser point on the screen is acquired.

In another embodiment, when a second laser point exists in a second image frame captured by a second camera among the N cameras, information about a location, on the screen, of the laser point on the screen may be acquired according to the first laser point and the second laser point, where the second camera corresponds to a second screen area, and the second image frame includes an image in the second screen area.

A method for acquiring the information about the location, on the screen, of the laser point on the screen may be determining the laser point on the screen from the first laser point and the second laser point; and acquiring the information about the location, on the screen, of the laser point on the screen. That is, an actual laser point on the screen is determined first according to the first laser point and the second laser point, and then information about a location of the actual laser point is acquired.

The determining the laser point on the screen from the first laser point and the second laser point may be using the first laser point as the laser point on the screen when the motion tendency of the laser point in the first screen area among the N screen areas is from the first screen area to the second screen area among the N screen areas, where the motion tendency is obtained according to the information about the locations of the laser points in the at least two previous image frames, the first image frame includes the image in the first screen area, and the second image frame includes the image in the second screen area; or using the second laser point as the laser point on the screen when the motion tendency is from the second screen area to the first screen area.

For the screen, when capturing images in adjacent areas, the cameras may capture images in areas partially overlapping each other, that is, when capturing the image in the first screen area, the first camera may also capture a part of the image in the adjacent second screen area. This may result in that laser points exist in the images captured by the two cameras. In this case, an accurate location of the laser point needs to be determined. After the first image frame is fused with the second image frame, when both the first laser point and the second laser point are located in an overlapping area of the first image frame and the second image frame, the laser point on the screen may be alternatively determined according to the method for determining the laser point on the screen from the first laser point and the second laser point.

In the initial state, if no previous image frame is available, the actual laser point may be not determined temporarily and is to be determined after an image frame is captured subsequently, which, however, is not limited herein. The actual laser point may be determined by using other methods.

Based on the foregoing embodiment, in another embodiment, the method for acquiring the information about the location, on the screen, of the laser point on the screen according to the first laser point and the second laser point may also be determining whether the first laser point and the second laser point are a same laser point according to first location information of the first laser point and second location information of the second laser point, where the first location information is the information about the location of the first laser point in the first image frame, the second location information is the information about the location of the second laser point in the second image frame, the second image frame includes the image in the second screen area among the N screen areas, the first image frame includes the image in the first screen area among the N screen areas, the second screen area may be or not be adjacent to the first screen area, and the adjacency may be having a common edge or a common vertex; and when the first laser point and the second laser point are the same laser point, acquiring the information about the location, on the screen, of the laser point on the screen according to the first location information and the second location information.

The N screen areas may be N subscreens, and the screen is a spliced projection screen including the N subscreens. Optionally, the N subscreens receive images projected by N projection devices, where the N projection devices correspond to the N subscreens in a one-to-one manner. In addition, the N cameras capture images on the N subscreens. In such a screen system, the N cameras capture the images on the N subscreens at the same time to ensure accuracy of subsequently acquired laser point coordinates and further reduce time for subsequent coordinate fusion. In specific implementation, the N cameras may further be connected to a synchronization apparatus, and the synchronization apparatus may send a pulse signal to the N camera to control the N cameras to capture the images on the N subscreens at the same time. In this embodiment, it is further supported that at least one laser pointer emits a laser point onto the spliced projection screen at the same time.

The synchronization apparatus may be a same device as the apparatus for detecting a location of a laser point on a screen; for example, both use a computer device.

Figure 6:
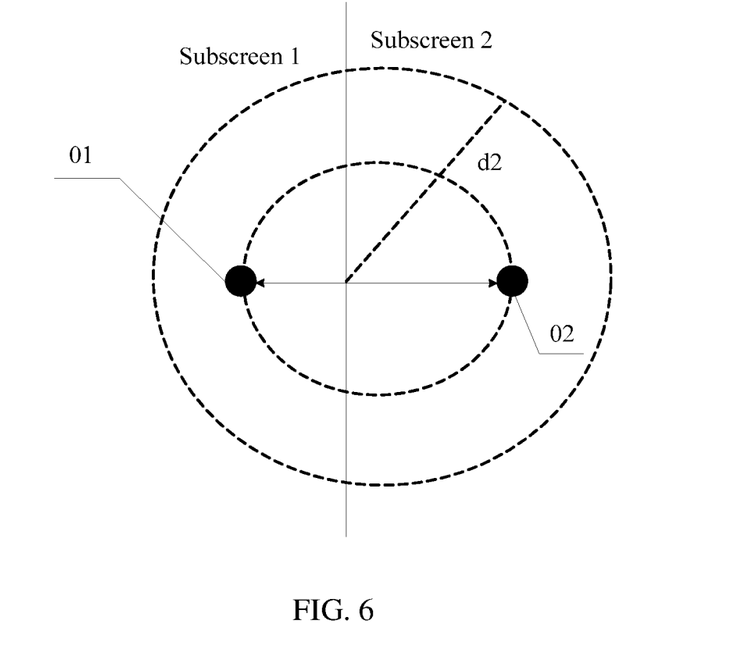
FIG. 6 is a schematic diagram of coordinate fusion in a method for detecting a location of a laser point on a screen according to the present application.

FIG. 6 is a schematic diagram of coordinate fusion in a method for detecting a location of a laser point on a screen according to the present application.

Based on the spliced projection screen, a gap exists between the subscreens, and therefore a boundary is more easily marked when the cameras capture the images on the subscreens. Marking may be performed by using a middle point of the gap to prevent a camera from capturing an image on an adjacent subscreen. However, in some special cases in which, for example, a laser point happens to be in the middle of a gap between adjacent subscreens, a part of the laser point exists in the first image frame captured by the first camera in the first screen area, and a part of the laser point also exists in the second image frame captured by the second camera in the adjacent second screen area. Therefore, an accurate location of the laser point needs to be further determined by means of coordinate fusion. When the second laser point exists in the second image frame captured by the second camera among the N cameras, whether the first laser point and the second laser point are the same laser point is determined according to the first location information of the first laser point and the second location information of the second laser point. When the first laser point and the second laser point are the same laser point, the information about the location of the laser point on the screen is acquired according to the first location information and the second location information.

If the first laser point and the second laser point are not the same laser point, it indicates that they may be laser points emitted by two laser pointers, that is, two target laser points exist. In this case, both the first location information and the second location information are information about locations, in the image frames, of actual laser points on the screen, and location information corresponding to the first location information and location information corresponding to the second location information are acquired from the screen coordinate system.

It should be noted that the first location information is the information about the location of the first laser point in the first image frame, and the second location information is the information about the location of the second laser point in the second image frame. The second camera corresponds to the second screen area, the first image frame includes the image in the first screen area, and the second image frame includes the image in the second screen area.

Referring to FIG. 6, it is assumed that a first laser point 01 is detected in the first image frame, and a second laser point 02 is detected in the second image frame. FIG. 6 shows corresponding coordinates of the first laser point 01 and the second laser point 02 in the first image frame and the second image frame respectively. The first laser point 01 is recorded as (x1, y1), the second laser point 02 is recorded as (x2, y2), and d2 is a duplication determining threshold. An absolute value d of a difference between the first laser point 01 and the second laser point 02 is calculated, that is, $d=|(x1, y1)-(x2, y2)|$, and if d is less than d2, the first laser point and the second laser point are the same laser point. In this case, valid location information (x0, y0) is calculated, and the valid location information is information about a location, in a captured image frame, of an actual laser point on the screen, that is, the location information in the camera coordinate system. Further, the information about the location of the laser point on the screen is acquired by means of coordinate transformation.

$x0=x1*w1+x2*w2$, and $y0=y1*w1+y2*w2$, where * is a multiple sign, and w1 and w2 are weight values. The d2 may be an empirical value or may be adjusted according to an actual detection result.

Figure 7:
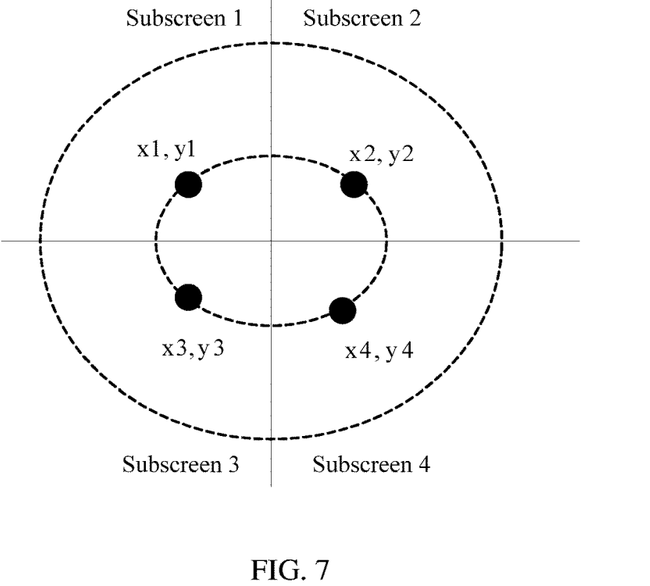
FIG. 7 is a schematic diagram of coordinate fusion in a method for detecting a location of a laser point on a screen according to the present application.

FIG. 7 is a schematic diagram of coordinate fusion in a method for detecting a location of a laser point on a screen according to the present application. FIG. 7 is similar to FIG. 6 except that laser points are detected on four adjacent subscreens. A method for fusing coordinates of the laser points is similar to the method used when two laser points are detected, and details are not described herein again.

Based on the embodiment, if the method is applied to a short-focus projection screen system, that is, a camera is extremely near a screen, an image needs to be captured by using a wide-angle camera for a purpose of acquiring a more complete and accurate image. If the camera is the wide-angle camera, before the information about the location of the first laser point on the screen is acquired, the first location information is calibrated to calibrate a distortion resulting from the wide-angle camera, so that the information about the location, on the screen, of the laser point on the screen is acquired according to the calibrated location information, where the first location information is the information about the location of the first laser point in the first image frame.

Figure 8:
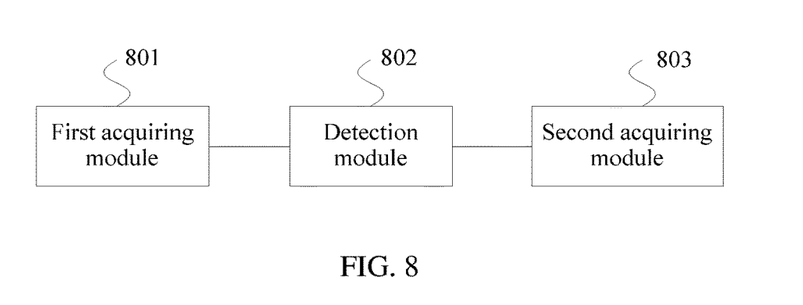
FIG. 8 is a schematic structural diagram of Embodiment 1 of an apparatus for detecting a location of a laser point on a screen according to the present application.

FIG. 8 is a schematic structural diagram of Embodiment 1 of an apparatus for detecting a location of a laser point on a screen according to the present application. The apparatus for detecting a location of a laser point on a screen may be the apparatus for detecting a location of a laser point on a screen in the screen projection system. The screen includes N screen areas, N cameras are used to capture images in the N screen areas, the screen areas correspond to the cameras in a one-to-one manner, and N is a positive integer greater than 1.

As shown in FIG. 8, the apparatus includes a first acquiring module 801, a detection module 802, and a second acquiring module 803.

The first acquiring module 801 is configured to acquire a first image frame captured by a first camera among the N cameras, where the first camera corresponds to a first screen area, the first image frame includes an image in the first screen area, and the first camera is one of the N cameras.

The detection module 802 is configured to detect whether a first laser point exists in the first image frame acquired by the first acquiring module.

The second acquiring module 803 is configured to, when the detection module determines that the first laser point exists in the first image frame, and no laser point exists in an image frame captured by another camera except the first camera among the N cameras, use the first laser point as the laser point on the screen, and acquire information about a location of the first laser point on the screen.

In this embodiment, a first image frame captured by a first camera is acquired; whether a first laser point exists in the first image frame is detected; and when the first laser point exists in the first image frame, and no laser point exists in an image captured by another camera except the first camera among N cameras, it is determined that the first laser point is a laser point on a screen, and information about a location of the first laser point on the screen is acquired. That is, images captured by all cameras do not need to be fused first; instead, laser point detection is directly performed on a captured image frame. This greatly improves efficiency of the laser point detection and improves detection accuracy.

Further, the detection module 802 is configured to, when laser points exist in at least two previous image frames of the first image frame, determine a motion tendency of a laser point in the first screen area among the N screen areas according to information about locations of the laser points in the at least two previous image frames, where the first image frame includes the image in the first screen area; determine a first detection area in the first image frame according to the motion tendency; and detect whether the first laser point exists in the first detection area. When the first laser point exists in the first detection area, the first laser point exists in the first image frame.

In another embodiment, the detection module 802 is configured to detect whether a first pixel exists in the first detection area, where pixels constituting the first laser point include the first pixel; and correspondingly, the second acquiring module 803 is configured to determine a second detection area in the first image frame according to information about a location of the first pixel in the first image frame; detect a second pixel in the second detection area, where the pixels constituting the first laser point include the second pixel, and acquire information about a location of the second pixel in the first image frame; and acquire the information about the location of the first laser point on the screen according to the information about the location of the second pixel in the first image frame.

In another embodiment, the detection module 802 is configured to determine a scanning area in the first image frame; perform downsampling on the scanning area by using m rows as a vertical sampling interval and n columns as a horizontal sampling interval to obtain a downsampling result, where m is a positive integer, and n is a positive integer; and detect whether the first laser point exists in the downsampling result. When the first laser point exists in the downsampling result, the first laser point exists in the first image frame.

In a specific implementation process, the detection module 802 may combine and implement two detection methods as described in the method embodiments, and details are not described herein again.

Further, the downsampling result includes a low-resolution image frame obtained after downsampling is performed on the first image frame. Correspondingly, the second acquiring module 803 is configured to acquire information about a low-resolution location of the first laser point in the low-resolution image frame; determine a potential area in the first image frame, where the potential area corresponds to the information about the low-resolution location; detect the first laser point in the potential area, and acquire information about a location of the first laser point in the first image frame; and acquire the information about the location of the first laser point on the screen according to the information about the location of the first laser point in the first image frame.

In another embodiment, the second acquiring module 803 is further configured to, when a second laser point exists in a second image frame captured by a second camera among the N cameras, acquire information about a location, on the screen, of the laser point on the screen according to the first laser point and the second laser point.

The second acquiring module 803 may be configured to determine the laser point on the screen from the first laser point detected by the detection module and the second laser point; and acquire the information about the location, on the screen, of the laser point on the screen.

Further, the second acquiring module 803 is configured to, when the laser points exist in the at least two previous image frames of the first image frame that is captured by the first camera, use the first laser point as the laser point on the screen when the motion tendency of the laser point in the first screen area among the N screen areas is from the first screen area to a second screen area among the N screen areas, where the motion tendency is obtained according to the information about the locations of the laser points in the at least two previous image frames, the first image frame includes the image in the first screen area, and the second image frame includes an image in the second screen area; or use the second laser point as the laser point on the screen when the motion tendency is from a second screen area to the first screen area.

The second acquiring module 803 may further be configured to determine whether the first laser point and the second laser point are a same laser point according to first location information of the first laser point detected by the detection module and second location information of the second laser point, where the first location information is the information about the location of the first laser point in the first image frame, the second location information is information about a location of the second laser point in the second image frame, the second image frame includes the image in the second screen area among the N screen areas, the first image frame includes the image in the first screen area among the N screen areas, and the second screen area is adjacent to the first screen area; and when the first laser point and the second laser point are the same laser point, acquire the information about the location, on the screen, of the laser point on the screen according to the first location information and the second location information.

The N screen areas are N subscreens, and the screen is a spliced projection screen including the N subscreens. Optionally, the N subscreens receive images projected by N projection devices, where the N projection devices correspond to the N subscreens in a one-to-one manner. In addition, the N cameras capture images on the N subscreens. In such a screen system, the N cameras capture the images on the N subscreens at the same time to ensure accuracy of subsequently acquired laser point coordinates and further reduce time for subsequent coordinate fusion.

Reference may be made to the foregoing method embodiments, and details are not described herein again.

If the apparatus is applied to a short-focus projection screen system, that is, a camera is extremely near a screen, an image needs to be captured by using a wide-angle camera for a purpose of acquiring a more complete and accurate image.

Figure 9:
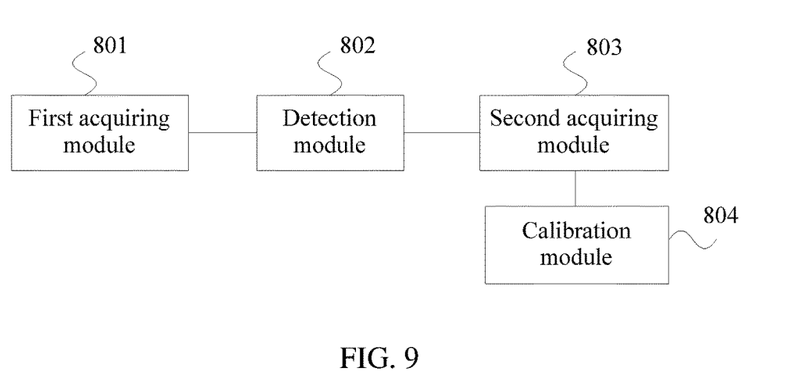
FIG. 9 is a schematic structural diagram of Embodiment 2 of an apparatus for detecting a location of a laser point on a screen according to the present application.

FIG. 9 is a schematic structural diagram of Embodiment 2 of an apparatus for detecting a location of a laser point on a screen according to the present application. As shown in FIG. 9, based on FIG. 8, the apparatus for detecting a location of a laser point on a screen may further include a calibration module 804 configured to calibrate the first location information to calibrate a distortion resulting from the wide-angle camera, so that the second acquiring module 803 acquires the information about the location, on the screen, of the laser point on the screen according to the calibrated location information, where the first location information is the information about the location of the first laser point in the first image frame.

An implementation principle and a technical effect of the apparatus are similar to those of the method and are not described herein again.

Figure 10:
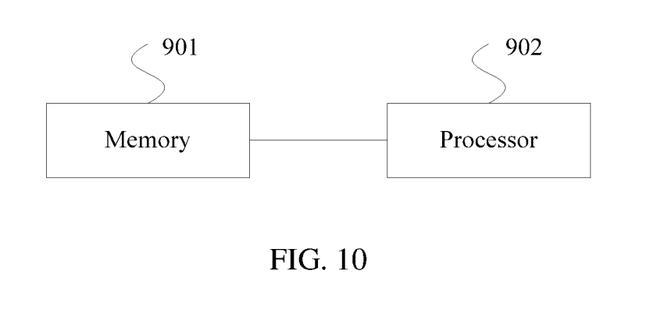
FIG. 10 is a schematic structural diagram of Embodiment 3 of an apparatus for detecting a location of a laser point on a screen according to the present application.

FIG. 10 is a schematic structural diagram of Embodiment 3 of an apparatus for detecting a location of a laser point on a screen according to the present application. The apparatus is applied to a screen projection system, and the system includes a screen and N cameras, where the screen includes N screen areas, the N cameras are used to capture images in the N screen areas, the screen areas correspond to the cameras in a one-to-one manner, and N is a positive integer greater than 1. As shown in FIG. 10, the apparatus includes a memory 901 and a processor 902.

The memory 901 is configured to store a program instruction, and the processor 902 is configured to invoke the program instruction in the memory 901 to perform a method that includes acquiring a first image frame captured by a first camera among the N cameras; detecting whether a first laser point exists in the first image frame; and when the first laser point exists in the first image frame, and no laser point exists in an image frame captured by another camera except the first camera among the N cameras, using the first laser point as a laser point on the screen, and acquiring information about a location of the first laser point on the screen. In this embodiment, a first image frame captured by a first camera is acquired; whether a first laser point exists in the first image frame is detected; and when the first laser point exists in the first image frame, and no laser point exists in an image captured by another camera except the first camera among N cameras, it is determined that the first laser point is a laser point on a screen, and information about a location of the first laser point on the screen is acquired. That is, images captured by all cameras do not need to be fused first; instead, laser point detection is directly performed on a captured image frame. This greatly improves efficiency of the laser point detection and improves detection accuracy.

Further, the processor 902 is configured to, when laser points exist in at least two previous image frames of the first image frame, determine a motion tendency of a laser point in a first screen area among the N screen areas according to information about locations of the laser points in the at least two previous image frames, where the first image frame includes an image in the first screen area; determine a first detection area in the first image frame according to the motion tendency; and detect whether the first laser point exists in the first detection area. When the first laser point exists in the first detection area, the first laser point exists in the first image frame.

The detecting whether the first laser point exists in the first detection area may be detecting whether a first pixel exists in the first detection area, where pixels constituting the first laser point include the first pixel; and correspondingly, the acquiring information about a location of the first laser point on the screen may be determining a second detection area in the first image frame according to information about a location of the first pixel in the first image frame; detecting a second pixel in the second detection area, where the pixels constituting the first laser point include the second pixel, and acquiring information about a location of the second pixel in the first image frame; and acquiring the information about the location of the first laser point on the screen according to the information about the location of the second pixel in the first image frame.

In another embodiment, the processor 902 is configured to determine a scanning area in the first image frame; perform downsampling on the scanning area by using m rows as a vertical sampling interval and n columns as a horizontal sampling interval to obtain a downsampling result, where m is a positive integer, and n is a positive integer; and detect whether the first laser point exists in the downsampling result.

The downsampling result includes a low-resolution image frame obtained after downsampling is performed on the first image frame. The processor 902 is configured to acquire information about a low-resolution location of the first laser point in the low-resolution image frame; determine a potential area in the first image frame, where the potential area corresponds to the information about the low-resolution location; detect the first laser point in the potential area, and acquire information about a location of the first laser point in the first image frame; and acquire the information about the location of the first laser point on the screen according to the information about the location of the first laser point in the first image frame.

Further, the processor 902 is further configured to, when a second laser point exists in a second image frame captured by a second camera among the N cameras, acquire information about a location, on the screen, of the laser point on the screen according to the first laser point and the second laser point.

The acquiring information about a location, on the screen, of the laser point on the screen according to the first laser point and the second laser point may be determining the laser point on the screen from the first laser point and the second laser point; and acquiring the information about the location, on the screen, of the laser point on the screen.

When the laser points exist in the at least two previous image frames of the first image frame that is captured by the first camera, the determining, by the processor 902, the laser point on the screen from the first laser point and the second laser point is as follows. The processor 902 uses the first laser point as the laser point on the screen when the motion tendency of the laser point in the first screen area among the N screen areas is from the first screen area to a second screen area among the N screen areas, where the motion tendency is obtained according to the information about the locations of the laser points in the at least two previous image frames, the first image frame includes the image in the first screen area, and the second image frame includes an image in the second screen area; or uses the second laser point as the laser point on the screen when the motion tendency is from the second screen area to the first screen area.

The acquiring, by the processor 902, information about a location, on the screen, of the laser point on the screen according to the first laser point and the second laser point may further be determining whether the first laser point and the second laser point are a same laser point according to first location information of the first laser point and second location information of the second laser point, where the first location information is the information about the location of the first laser point in the first image frame, the second location information is information about a location of the second laser point in the second image frame, the second image frame includes an image in a second screen area among the N screen areas, the first image frame includes the image in the first screen area among the N screen areas, and the second screen area is adjacent to the first screen area; and when the first laser point and the second laser point are the same laser point, acquiring the information about the location, on the screen, of the laser point on the screen according to the first location information and the second location information.

The N screen areas may be N subscreens, and the screen is a spliced projection screen including the N subscreens. Optionally, the N subscreens receive images projected by N projection devices, where the N projection devices correspond to the N subscreens in a one-to-one manner. In addition, the N cameras capture images on the N subscreens. In such a screen system, the N cameras capture the images on the N subscreens at the same time to ensure accuracy of subsequently acquired laser point coordinates and further reduce time for subsequent coordinate fusion.

If the camera is a wide-angle camera, the processor 902 is further configured to, before acquiring the information about the location of the first laser point on the screen, calibrate the first location information to calibrate a distortion resulting from the wide-angle camera, so that the information about the location, on the screen, of the laser point on the screen is acquired according to the calibrated location information, where the first location information is the information about the location of the first laser point in the first image frame.

Figure 11:
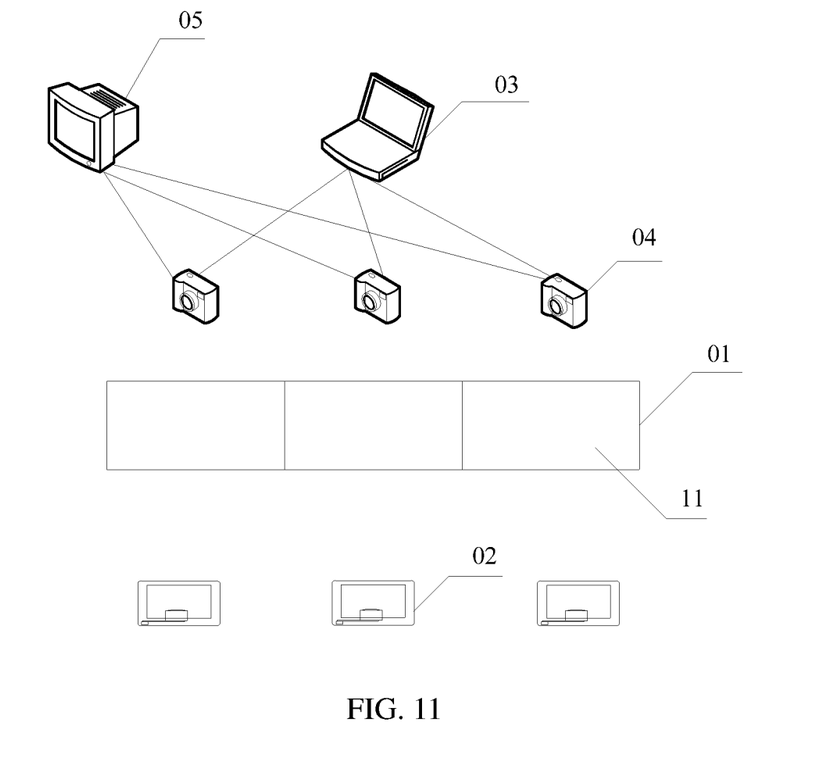
FIG. 11 is a schematic structural diagram of Embodiment 1 of a screen projection system according to the present application.

FIG. 11 is a schematic structural diagram of Embodiment 1 of a screen projection system according to the present application. As shown in FIG. 11, the system may include a screen 01, the apparatus 03 for detecting a location of a laser point on a screen, and N cameras 04, where N is a positive integer greater than 1; the screen 01 includes N screen areas 11, the N cameras 04 capture images in the N screen areas, and the screen areas correspond to the cameras in a one-to-one manner. In FIG. 10, N=3 is used as an example.

The system further includes a projection device 02, where the projection device 02 projects an image onto the screen 01. One or more projection devices may be available. A specific quantity may be set according to an actual need, which is not limited herein.

The system may further include a laser pointer, where the laser pointer projects a laser point onto the screen.

The system may further include N projection devices. The N screen areas are N subscreens, and the screen is a spliced projection screen including the N subscreens. The subscreens correspond to the projection devices in a one-to-one manner, and no overlapping area exists between respective projection areas of the N projection devices. Each of the subscreens may be enclosed in a projection device corresponding to each of the subscreens, so that no light travels in space between the project device and another subscreen.

Referring to FIG. 11, the system may further include a synchronization apparatus 05 configured to connect to the N cameras, and the synchronization apparatus is configured to control the N cameras to capture the images in the N screen areas at the same time.

No overlapping area may exist between respective images captures by the N cameras. Each of the subscreens may be enclosed in a camera corresponding to each of the subscreens, so that no light travels in space between the camera and another subscreen.

The apparatus 03 for detecting a location of a laser point on a screen in the system is the apparatus for detecting a location of a laser point on a screen in the foregoing embodiment, implementation principles and technical effects of both apparatuses are similar and are not described herein again.

The synchronization apparatus 05 may send a pulse message to the N cameras 04 at the same time, so as to trigger the N cameras 04 to capture images on the N subscreens at the same time, which, however, is not limited herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for detecting a location of a laser point on a screen of a screen projection system, the method comprising:
    acquiring a first image frame captured by a first camera of a plurality of cameras, each of the plurality of cameras configured to capture an image in an associated one of a corresponding plurality of screen areas of a screen;
    detecting whether a first laser point projected on the screen by a laser pointer exists in the first image frame;
    using the first laser point as a laser point on the screen when the first laser point exists in the first image frame and no laser point exists in an image frame captured by any camera of the plurality of cameras other than the first camera; and
    acquiring information about a location of the first laser point on the screen.

2. The method according to claim 1, wherein when laser points exist in at least two previous image frames of the first image frame, detecting whether the first laser point exists in the first image frame comprises:
    determining a motion tendency of a laser point in a first screen area in the plurality of screen areas according to information about locations of laser points in the at least two previous image frames, the first image frame comprising an image in the first screen area;
    determining a first detection area in the first image frame according to the motion tendency; and
    detecting whether the first laser point exists in the first detection area.

3. The method according to claim 2, wherein:
    detecting whether the first laser point exists in the first detection area comprises detecting whether a first pixel exists in the first detection area, pixels constituting the first laser point comprising the first pixel; and
    acquiring the information about the location of the first laser point on the screen comprises:
        determining a second detection area in the first image frame according to information about a location of the first pixel in the first image frame;
        detecting a second pixel in the second detection area, the pixels constituting the first laser point comprising the second pixel;
        acquiring information about a location of the second pixel in the first image frame; and acquiring the information about the location of the first laser point on the screen according to the information about the location of the second pixel in the first image frame.

4. The method according to claim 1, wherein detecting whether the first laser point exists in the first image frame comprises:
determining a scanning area in the first image frame;
performing downsampling on the scanning area by using m rows as a vertical sampling interval and n columns as a horizontal sampling interval to obtain a downsampling result, m being a positive integer and n being a positive integer; and
detecting whether the first laser point exists in the downsampling result.

5. The method according to claim 4, wherein the downsampling result comprises a low-resolution image frame obtained after the downsampling is performed on the scanning area, and acquiring the information about the location of the first laser point on the screen comprises:
acquiring information about a low-resolution location of the first laser point in the low-resolution image frame;
determining a potential area in the first image frame, the potential area corresponding to the information about the low-resolution location
detecting the first laser point in the potential area;
acquiring information about a location of the first laser point in the first image frame; and
acquiring the information about the location of the first laser point on the screen according to the information about the location of the first laser point in the first image frame.

6. The method according to claim 1, the method further comprising acquiring information about a location of the laser point on the screen according to the first laser point and a second laser point when the second laser point exists in a second image frame captured by a second camera of the plurality of cameras.

7. The method according to claim 6, wherein acquiring the information about the location of the laser point on the screen according to the first laser point and the second laser point comprises:
determining the laser point on the screen from the first laser point and the second laser point; and
acquiring the information about the location of the laser point on the screen.

8. The method according to claim 7, wherein when laser points exist in at least two previous image frames of the first image frame, determining the laser point on the screen from the first laser point and the second laser point comprises:
using the first laser point as the laser point on the screen when a motion tendency of the laser point in the first screen area among the plurality of screen areas is from the first screen area to a second screen area among the plurality of screen areas, the motion tendency being obtained according to the information about the locations of the laser points in the at least two previous image frames, the first image frame comprising the image in the first screen area, and the second image frame comprising an image in the second screen area; or
using the second laser point as the laser point on the screen when the motion tendency is from a second screen area to the first screen area.

9. The method according to claim 6, wherein acquiring the information about the location of the laser point on the screen according to the first laser point and the second laser point comprises:
determining whether the first laser point and the second laser point are a same laser point according to first location information of the first laser point and second location information of the second laser point, the first location information being information about a location of the first laser point in the first image frame, the second location information being information about a location of the second laser point in the second image frame, the second image frame including an image in a second screen area among the plurality of screen areas, the first image frame including an image in a first screen area among the plurality of screen areas, and the second screen area being adjacent to the first screen area; and
acquiring the information about the location of the laser point on the screen according to the first location information and the second location information when the first laser point and the second laser point are the same laser point.

10. The method according to claim 1, wherein the first camera is a wide-angle camera, and before acquiring the information about the location of the first laser point on the screen, the method further comprises calibrating a first location information to calibrate a distortion resulting from the wide-angle camera, so that the information about the location of the laser point on the screen is acquired according to the calibrated first location information, wherein the first location information is information about the location of the first laser point in the first image frame.

11. An apparatus for detecting a location of a laser point on a screen, the apparatus comprising:
a memory storing instructions; and
a processor coupled to the memory and configured to execute the instructions to:
acquire a first image frame captured by a first camera of a plurality of cameras, each of the plurality of cameras configured to capture an image in an associated one of a corresponding plurality of screen areas of a screen;
detect whether a first laser point projected on the screen by a laser pointer exists in the first image frame;
use the first laser point as a laser point on the screen when the first laser point exists in the first image frame and no laser point exists in an image frame captured by any camera of the plurality of cameras other than the first camera; and
acquire information about a location of the first laser point on the screen.

12. The apparatus according to claim 11, wherein the processor is configured to:
determine a motion tendency of a laser point in a first screen area in the plurality of screen areas according to information about locations of laser points in at least two previous image frames when the laser points exist in the at least two previous image frames of the first image frame, the first image frame comprising an image in the first screen area;
determine a first detection area in the first image frame according to the motion tendency; and
detect whether the first laser point exists in the first detection area.

13. The apparatus according to claim 12, the processor is configured to:

detect whether a first pixel exists in the first detection area, pixels constituting the first laser point comprising the first pixel;

determine a second detection area in the first image frame according to information about a location of the first pixel in the first image frame;

detect a second pixel in the second detection area, the pixels constituting the first laser point comprising the second pixel;

acquire information about a location of the second pixel in the first image frame; and acquire the information about the location of the first laser point on the screen according to the information about the location of the second pixel in the first image frame.

14. The apparatus according to claim 11, wherein the processor is configured to:

determine a scanning area in the first image frame;

perform downsampling on the scanning area by using m rows as a vertical sampling interval and n columns as a horizontal sampling interval to obtain a downsampling result, m being a positive integer and n being a positive integer; and detect whether the first laser point exists in the downsampling result.

15. The apparatus according to claim 14, wherein the downsampling result comprises a low-resolution image frame acquired after the downsampling is performed on the scanning area, and wherein the processor is configured to:

acquire information about a low-resolution location of the first laser point in the low-resolution image frame;

determine a potential area in the first image frame, wherein the potential area corresponds to the information about the low-resolution location;

detect the first laser point in the potential area;

acquire information about a location of the first laser point in the first image frame; and acquire the information about the location of the first laser point on the screen according to the information about the location of the first laser point in the first image frame.

16. The apparatus according to claim 11, wherein the processor is further configured to acquire information about a location of the laser point on the screen according to the first laser point and a second laser point when the second laser point exists in a second image frame captured by a second camera of the plurality of cameras.

17. A screen projection system, comprising:

a screen, comprising a plurality of screen areas;

an apparatus for detecting a location of a laser point projected on the screen by a laser pointer; and a plurality of cameras, each configured to capture an image in a corresponding one of the plurality of screen areas, wherein the apparatus for detecting the location of the laser point on the screen comprises:

a memory storing instructions; and a processor coupled to the memory and configured to execute the instructions to:

acquire a first image frame captured by a first camera of a plurality of cameras, each of the plurality of cameras configured to capture an image in an associated one of a corresponding plurality of screen areas of a screen;

detect whether a first laser point projected on the screen by a laser pointer exists in the first image frame;

use the first laser point as a laser point on the screen when the first laser point exists in the first image frame and no laser point exists in an image frame captured by any camera of the plurality of cameras other than the first camera; and acquire information about a location of the first laser point on the screen.

18. The system according to claim 17, wherein the system comprises a plurality of projection devices, the plurality of screen areas being a plurality of subscreens, the screen being a spliced projection screen comprising the plurality of subscreens, the plurality of subscreens corresponding to the plurality of projection devices in a one-to-one manner, and no overlapping area existing between respective projection areas of the plurality of projection devices.

19. The system according to claim 17, wherein the system further comprises a synchronization apparatus configured to connect to the plurality of cameras, the synchronization apparatus being configured to control the plurality of cameras to capture the images in the plurality of screen areas at the same time.

20. The system according to claim 17, wherein no overlapping area exists between the respective images captured by the plurality of cameras.

* * * * *

UNITED STATES PATENT AND TRADEMARK OFFICE
CERTIFICATE OF CORRECTION

PATENT NO. : 10,129,471 B2
APPLICATION NO. : 15/207101
DATED : November 13, 2018
INVENTOR(S) : Zhaoxiang Liu and Shiguo Lian Page 1 of 1

It is certified that error appears in the above-identified patent and that said Letters Patent is hereby corrected as shown below:

On the Title Page

Item (30), Line 1: "201510490798" should read "201510490798.7"

In the Claims

Column 22, Line 66: insert --wherein-- after "claim 12,"

Signed and Sealed this
Eighth Day of January, 2019

Andrei Iancu
*Director of the United States Patent and Trademark Office*